March 8, 1960
W. VAN E. THOMPSON
2,927,598
NON-SPILL ANTI-SIPHON SHUT OFF VALVE
Filed Jan. 24, 1955
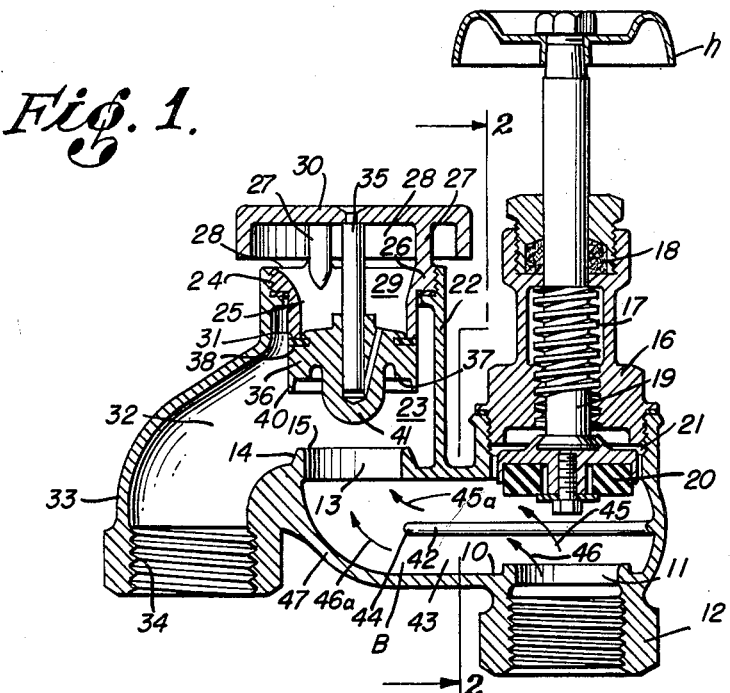
*Fig. 1.*
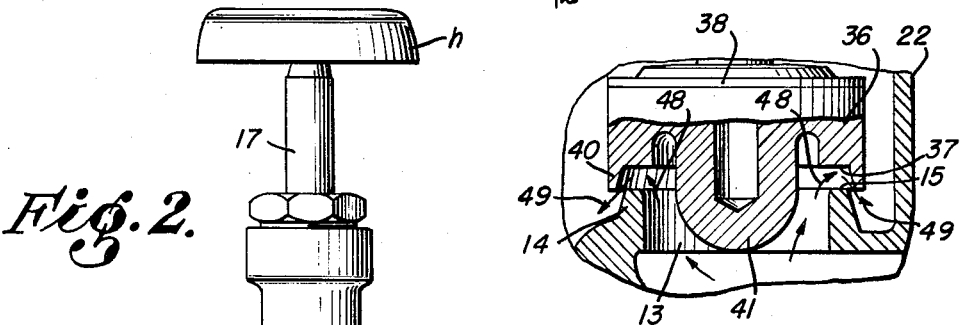
*Fig. 2.*
*Fig. 3.*
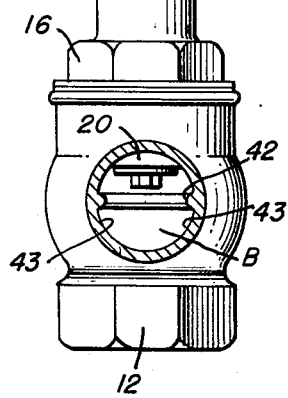
INVENTOR
WALTER VAN E. THOMPSON
BY
ATTORNEY

United States Patent Office 2,927,598
Patented Mar. 8, 1960

2,927,598

NON-SPILL ANTI-SIPHON SHUT OFF VALVE

Walter Van E. Thompson, Los Angeles, Calif.

Application January 24, 1955, Serial No. 483,519

2 Claims. (Cl. 137—218)

My invention relates to shut off valves and relates in particular to an anti-siphoning valve which will prevent siphoning of water back into the pipes of a water distributing system when water pressure in the system is shut off.

Many anti-siphoning valves have the disadvantage of spilling water out through the air opening associated with the check valve arranged to prevent reverse flow. It is an object of the invention to provide an anti-siphoning shut off valve which will not spill water out through the air passages associated with the check valve portion of the valve structure.

It is a further object of the invention to provide within the hollow body of the valve structure baffles arranged to reduce the turbulence of the flow of water toward the check valve, so that the flow of water which reaches the closure of the check valve will be of a character to instantly move the closure into a position closing the air passage before a flow of water can pass out through and spill from this air passage.

A further object of the invention is to provide in this anti-siphoning shut off valve structure a combined check valve and float valve of a form which contributes to effecting rapid and positive movement of the float valve into a position to close the air passage in response to forward flow of water through the check valve port. The combined float and check valve is of such vertical dimension or thickness that its closure faces are vertically spaced so that the air passage will be closed before the water level in the check valve chamber rises to the upper end of the combined float and check valve. An important feature of the form of the invention shown is that the float may be conveniently made from plastic material of less specific gravity than water and which will rise quickly into a position to close the air passage.

A further object of the invention is to provide an anti-siphoning valve device having a shut off closure arranged to be retracted into a recess when the shut off valve is opened, out of the path of forward flow of the water so that it will not create turbulence in the water flowing toward the check valve port.

Further objects and advantages of the invention may be brought out in the following part of the specification wherein small details of construction have been described for the purpose of making a complete disclosure, without the intention of limiting the invention which is defined by the appended claims.

Referring to the accompanying drawings which are for illustrative purposes only:

Fig. 1 is a sectional view through a preferred embodiment of the invention;

Fig. 2 is a sectional view taken as indicated by the line 2—2 of Fig. 1; and

Fig. 3 is a fragmentary sectional view showing the float valve of the device in another position.

The anti-siphoning shut off valve, as shown in Fig. 1, has a valve body B of horizontally elongated hollow construction. At one end of the valve body B its bottom wall 10 is provided with a vertically arranged inlet port 11 formed in part by an extension 12 which is internally threaded, as shown, for connection to the upper end of a water pipe of a water distributing system.

At the opposite end of the body B from the end thereof provided with the inlet opening 11 there is an upwardly spaced check valve port 13 defined in part by an upwardly projecting annular lip 14 providing a check valve seat 15.

A bonnet 16, threaded into the upper part of the valve body B, carries a threaded valve stem 17 and a gland 18 for preventing leakage of water out around the stem 17. The lower end 19 of the valve stem 17 carries a shut off valve closure 20, which is shown in raised position, with a portion thereof extending into a recess 21 provided in the upper wall of the body B in alignment with the water inlet port 11. By rotation of the handle h which is connected to the upper end of the valve stem 17 it is possible to move the shut off closure 20 downward from the position in which it is shown into a position to close the water inlet port 11.

A wall 22 is extended upwardly from the body B at the end thereof opposite to the inlet port 11 and in surrounding relation to the vertical axis of the check valve port 13, to define a check valve chamber 23. The upper end of the wall 22 defines an opening arranged to receive the tubular body 25 of an air connection arranged to connect the interior of the valve chamber 23 with external atmosphere. This air connection 26 has spaced posts 27 extending upwardly from the body 25 so as to form air ports 28 which communicate with the passage 29 through the body 25. A canopy 30 is supported by the posts 27 in a position to cover the ports 28 and the passage 29. At the lower end of the tubular body 25 there is an annular valve seat 31 facing downwardly and being disposed in spaced relation to the check valve seat 15. The check valve chamber 23 has an outlet opening 32 defined in part by a downwardly extending wall 33 provided with internal threads 34 for connection to a pipe which is to receive water from the distributing system to which the inlet port 11 is connected.

An axial pin 35 is extended downwardly from the transverse wall of the canopy 30, to serve as a guide for a float valve 36 having a downwardly presented annular seat 37 to engage the check valve seat 15 when the float valve 36 is lowered from the position in which it is shown in Fig. 1. The upper part of the float valve 36 has an annular wall portion 38, in the form of a gasket, for engagement with the seat 31 of the air connection 26 to close off the air passage 29 when the float valve 36 is raised as shown in Fig. 1.

The float valve 36 has a downwardly extending skirt 40 around the annular face 37, of greater diameter than the annular lip 14, so that it will extend downwardly around the upper portion of the lip 14 when the float valve 36 is in lowered position. The lower portion of the float valve 36 includes a downwardly presented protuberance 41 having a rounded end which projects downwardly through the check valve port 13 when the float valve 36 is lowered.

As shown in Figs. 1 and 2, horizontal baffles 42 project inwardly from the side walls 43 of the body B. The leftward ends 44 of the baffles 42 terminate at a point below the rightward extremity of the check valve port 13. As indicated by the arrows 45, 45a, 46 and 46a, water from the inlet 11 will flow smoothly, or with small turbulence laterally above and below the baffles 42 and in the space between them. The leftward end 47 of the bottom wall portion of the container B curves upwardly so as to turn the flow of water indicated by the arrow 46a upwardly toward the check valve port 13. The flow of water upwardly through the check valve port 13 applies an upward force to the float valve 36 to hold the same in engagement with the seat 31, this force acting independently of the force resulting from flotation of the float valve 36 and the force resulting from the pressure differential between the check valve chamber 23 and the air passage 29. The float valve 36 is molded from plastic having a specific gravity less than that of water, thereby providing for flotation of the float valve by the water entering the check valve chamber.

When zero of negative pressure exists in the interior of the valve body B, float valve 36 will rest upon the check valve seat 15. When a flow of water is reestablished through the inlet port 11, water will flow upwardly through the check valve port 13 and be formed by the protuberance 41 into an annular stream which engages the lower face of the float valve 36, within the limits of the skirt 40, as indicated by arrows 48 in Fig. 3. This will apply a first lifting effect to the float valve 36 and the water will flow outwardly across the annular face 37, to be then deflected into downwardly reversed flow as indicated by arrows 49. This turning of the flow of water downwardly by the skirt 40 produces an upward reaction against the float valve 36, which augments the first lifting effect so as to move the upper portion thereof more quickly into engagement with the seat 31 in advance of the rise of the water level in the check valve chamber 23, preventing spillage of water outwardly through the air ports 28. When the shut off valve is actuated to open condition, the closure 20 is retracted into the recess 21 so as to remove it from the path of flow of water from the inlet 11 sufficiently to avoid turbulence of the water flow being caused by the closure 20.

I claim:

1. In a non-siphoning shut off valve: a first hollow body forming a water receiving chamber, said chamber having longitudinal baffles extending inwardly from the side walls thereof to stabilize the flow of water therethrough and a deflecting wall to turn upwardly said through flow of water, a second hollow body forming a check valve chamber, said check valve chamber having in the lower wall thereof an upwardly projecting annular wall defining an inlet port to receive water turned upwardly by said deflecting wall, and a downwardly projecting annular wall defining an outlet port, said check valve chamber having in the upper wall thereof above said inlet port an opening communicating with the exterior atmosphere, a cap covering said opening, a guide pin extending downwardly from said cap toward said inlet port, an annular wall defining a downwardly faced air port surrounding said pin, a check valve positioned between said air port and said water inlet port, said check valve having a pin-receiving opening extending downwardly therein from the upper face thereof to receive the lower portion of said guide pin and be guided thereby between said air port and said water inlet port, an annular portion on the upper face of said check valve to close said air port when said check valve is in raised position and an annular portion on the lower face of said check valve to close said water inlet port when said check valve is lowered, a downwardly projecting rounded end protuberance formed on the lower face of said check valve and extending below said annular portion on the lower face of said check valve whereby the upward flow of water through said water inlet valve is formed into an annular stream, said protuberance including therein the lower portion of said pin-receiving opening of said check valve, an annular skirt projecting downwardly from said check valve around said upwardly projecting wall to define in the lower face of said check valve an annular cavity arranged to receive the annular upward flow of water through said inlet port and deflect the same in a reverse direction downwardly around the exterior of said upwardly projecting wall into said check valve chamber whereby the reaction of said deflected flow of liquid against said check valve will augment the pressure resulting from said upward flow so as to move the check valve more quickly upwardly into a position closing said air port and prevent escape of water therethrough, said longitudinal baffles having reduced the flow of water upwardly through said inlet port to a state of such low turbulence as to cause said check valve to be raised into engagement with said air port without spillage of water therethrough.

2. A non-siphoning valve as defined in claim 1 wherein the check valve is fabricated from a material having a specific gravity less than that of water.

References Cited in the file of this patent

UNITED STATES PATENTS

| | | |
|---|---|---|
| 651,289 | Benton | June 5, 1900 |
| 1,486,251 | Knight | Mar. 11, 1924 |
| 2,159,691 | Fox | May 23, 1939 |
| 2,252,164 | Cantor | Aug. 12, 1941 |
| 2,272,304 | Lohman | Feb. 10, 1942 |
| 2,282,188 | Horne | May 5, 1942 |
| 2,303,037 | Fredrickson | Nov. 24, 1942 |
| 2,306,508 | Svirsky | Dec. 29, 1942 |
| 2,324,084 | Horner | July 13, 1943 |
| 2,325,956 | Holtman | Aug. 3, 1943 |
| 2,604,113 | Barsano | July 22, 1952 |
| 2,621,015 | MacGregor | Dec. 9, 1952 |
| 2,745,432 | Williams | May 15, 1956 |
| 2,802,481 | Jahn | Aug. 13, 1957 |